(12) United States Patent
Kim et al.

(10) Patent No.: US 8,810,228 B2
(45) Date of Patent: Aug. 19, 2014

(54) METHOD FOR CORRECTING CURRENT OF PWM CONVERTER

(75) Inventors: Sung Kyu Kim, Gyeonggi-do (KR); Wonkyoung Choi, Gyeonggi-do (KR); Mu Shin Kwak, Gyeonggi-do (KR); Suhyun Bae, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 231 days.

(21) Appl. No.: 13/533,184

(22) Filed: Jun. 26, 2012

(65) Prior Publication Data

US 2013/0147459 A1    Jun. 13, 2013

(30) Foreign Application Priority Data

Dec. 8, 2011    (KR) .................. 10-2011-0131200

(51) Int. Cl.
| | | |
|---|---|---|
| G05F 1/00 | (2006.01) | |
| H03K 5/22 | (2006.01) | |
| H02M 3/335 | (2006.01) | |
| H02H 7/122 | (2006.01) | |

(52) U.S. Cl.
USPC ........ 323/285; 327/24; 363/21.01; 363/56.02

(58) Field of Classification Search
USPC ................. 323/282–285; 327/15, 24; 363/19, 363/21.01, 56.02, 56.03
See application file for complete search history.

(56) References Cited

U.S. PATENT DOCUMENTS

| | | | | |
|---|---|---|---|---|
| 6,288,524 | B1 * | 9/2001 | Tsujimoto | 323/285 |
| 7,309,977 | B2 * | 12/2007 | Gray et al. | 323/284 |
| 7,518,351 | B2 * | 4/2009 | Liao et al. | 323/284 |
| 7,598,718 | B2 * | 10/2009 | Lipcsei et al. | 323/284 |
| 7,876,081 | B2 * | 1/2011 | Hachiya et al. | 323/284 |
| 2009/0218998 | A1 * | 9/2009 | Huang et al. | 323/282 |
| 2011/0115458 | A1 * | 5/2011 | Schafmeister et al. | 323/284 |

FOREIGN PATENT DOCUMENTS

| | | |
|---|---|---|
| JP | 2004327102 A | 11/2004 |
| KR | 10-2010-0123854 | 11/2010 |
| KR | 10-0992412 | 11/2010 |
| KR | 10-2011-0057685 | 6/2011 |

* cited by examiner

*Primary Examiner* — Adolf Berhane
*Assistant Examiner* — Gary Nash
(74) *Attorney, Agent, or Firm* — Edwards Wildman Palmer LLP; Peter F. Corless

(57) ABSTRACT

The present invention relates to a method for compensating a current of a DC/DC converter that detects an average value of a pulsatory current that is output as a chopping wave form from an inductor that is used in a DC/DC converter to compensate an offset value in real time. A method for compensating a current of a DC/DC converter can include analyzing a PWM signal for a switching DC-DC converter, if the PWM signal is on, comparing a delay time with a rise half cycle size between a detected current and a real current that is output by an inductor, calculating a current variation amount and determining an offset compensation value for compensating a current variation amount according to the comparison result of the rise half cycle size and the delay time, and applying the offset compensation value to compensate the detected current of the inductor.

7 Claims, 8 Drawing Sheets

METHOD FOR CORRECTING CURRENT OF PWM CONVERTER

CROSS-REFERENCE TO RELATED APPLICATION

This application claims priority to and the benefit of Korean Patent Application No. 10-2011-0131200 filed in the Korean Intellectual Property Office on Dec. 8, 2011, the entire contents of which are incorporated herein by reference.

FIELD OF THE INVENTION

The present invention relates to a method for compensating a current of a DC/DC converter and an inverter (hereinafter, PWM inverter) for an environmentally-friendly vehicle. More particularly, the present invention relates to a method for compensating a current of a PWM converter for an environmentally-friendly vehicle that detects an average value of a pulsatory current that is output as a chopping wave form from an inductor inside a converter and each phase (U, V, W) of a motor to compensate an offset value in real time.

BACKGROUND OF THE INVENTION

An environmentally-friendly vehicle having an engine and at least one drive motor is being developed corresponding to a demand for improving fuel consumption efficiency and an exhaust gas regulation reinforcement.

An environmentally-friendly vehicle includes a fuel cell vehicle, an electric vehicle, a plug-in electric vehicle, and so on, and uses high voltage/high current power to generate a driving torque.

An environmentally-friendly vehicle includes a motor generating a demanded driving torque, an inverter controlling the motor, and a DC/DC converter that boosts a voltage of 350 to 450 V stored in a battery to supply the boosted voltage to the inverter.

The DC-DC converter is a bidirectional booster type, is disposed between the high voltage battery and the inverter, and boosts a low voltage to a high voltage.

While the PWM converter is boosting the voltage, the environmentally-friendly vehicle detects the current that is outputted by the inductor to perform current control and power limitation. And, an inverter detects current flowing each phase of a motor to control current and generates driving force of a motor through the current control The current of the inductor has a pulsatory (chopping wave) shape that repeatedly ascends and descends with a predetermined slope according to the switching condition of a power switching element.

In this condition, one cycle average current value that is outputted from the inductor is used to limit the boosted current and the outputted power.

FIG. 8 shows an offset of an inductor current in a DC-DC converter for a conventional environmentally-friendly vehicle.

Referring to FIG. 8, when first and second switching elements are switched according to a first PWM duty signal (PWM P) and a second PWM duty signal (PWM N) that is transmitted from a controller, a delay of Td1 and Td2 against output is formed in a real output current (Ideal) and a detected current (Real) of an inductor by on/off delay of the first and second switching elements, a phase delay of a current sensor, a phase delay of a filter circuit, and so on to generate a±offset value.

Accordingly, the offset generation of an inductor current in the PWM converter affects the control precision (current control and torque control) and the current related protection function.

Because the sensing delay of the inductor current is inevitable, a power module in which the on/off characteristic is fast and a sensor and a filter circuit in which phase delay responsiveness is excellent are used so as to minimize the delay, but these elements are very expensive and elements satisfying the terms desired by the environmentally-friendly vehicle are very limited.

In a condition in which a difference between real timing in which the current is outputted from an inductor and measured timing thereof is formed, a power limitation function can malfunction by an error of a current measurement timing during maximum driving and regenerative braking of a real vehicle to be able to generate a problem of stopping the vehicle from driving.

In a conventional environmentally-friendly vehicle, an A/D sensing delay method, a phase delay method, an average current calculation method, and so on are applied to measure the inductor current of the DC-DC converter.

The A/D sensing delay method estimates a delay time ($t_{delay}$) for an error between real timing in which the current is output from an inductor and measurement timing thereof through hardware (H/W) using a sensor or an estimation method through software (S/W) to adjust the measurement timing of the inductor current.

However, the method has a problem that it has a limitation for calculation of a processor for controlling current in digital control.

The phase delay method delays the phase of the current measured by 90 degrees, and this method can be applied to a system in which the control responsiveness is relatively slow, but cannot be applied to a system in which the control responsiveness is fast.

Also, the average current calculation method calculates an average current through current sampling twice for one cycle to demand multiple sampling for one cycle, and therefore the method can be applied to a control method that demands control once within one cycle but is incongruent with a control method that demands multiple control within one cycle.

Also, in a condition in which a delay of the measured time is larger than a transmitted PWM duty signal, there is a problem that an error is generated when compensating the offset value.

The above information disclosed in this Background section is only for enhancement of understanding of the background of the invention and therefore it can contain information that does not form the prior art that is already known in this country to a person of ordinary skill in the art.

SUMMARY OF THE INVENTION

The present invention has been made in an effort to provide a method for compensating current of a DC/DC converter for an environmentally-friendly vehicle that detects an ascent slope and a descent slope of a pulsatory current that is output as a chopping wave form from an inductor of a DC-DC converter to calculate a variation amount of current, calculates an average current of an inductor according to a PWM duty signal by considering a delay of a real current and detected current to calculate an offset value in real time, and compensates the offset value.

A method for compensating a current of a PWM converter according to an exemplary embodiment of the present invention can include analyzing a PWM signal for a switching PWM converter, if the PWM signal is on, comparing a delay time with a rise half cycle size between a detected current and a real current that is output by an inductor, calculating a current variation amount and determining an offset compensation value for compensating a current variation amount according to the comparison result of the rise half cycle size and the delay time, and applying the offset compensation value to compensate the detected current of the inductor.

If the PWM signal is off, the method can further include comparing a descent half cycle size and a delay time between a real current that is outputted from an inductor and a detected current, calculating a current variation amount according to the comparison result of the descent half cycle size and the delay time to determine an offset compensation value for compensating the current variation amount, and applying the offset compensation value to compensate the detected current of the inductor.

If the size of an ascent half cycle is less than a delay time when the size of an ascent half cycle is compared with a delay time in a condition that the PWM signal is on, it can be determined that a slope of a real output that is outputted from an inductor is different from that of a detected current and a current variation amount of the ascent slope is calculated to determine an offset compensation value for compensating a current variation amount.

If the size of an ascent half cycle is larger than a delay time when the size of an ascent half cycle is compared with a delay time, it can be determined that a slope of a real current that is outputted from an inductor is equal to that of a detected current, and a current variation amount of an ascent slope is calculated to determine an offset compensation value for compensating a current variation amount.

If the size of a descent half cycle is smaller than a delay time when the size of a descent half cycle is compared with a delay time in an off condition of the PWM signal, it can be determined that a slope of a real current that is outputted from an inductor is different from that of a detected current, and a current variation amount of a descent slope is calculated to determine an offset compensation value for compensating a current variation amount.

If the size of a descent half cycle is larger than a delay time when the size of a descent half cycle is compared with a delay time in an off condition of the PWM signal, it can be determined that a slope of a real current that is outputted from an inductor is equal to that of a detected current, and a current variation amount of a descent slope is calculated to determine an offset compensation value for compensating a current variation amount.

A non-transitory computer readable medium according to an exemplary embodiment of the present invention contains program instructions executed by a processor or controller for implementing a method for compensating a current of a PWM converter. The computer readable medium includes program instructions that analyze a PWM signal for a switching PWM converter; program instructions that, if the PWM signal is on, compare a delay time with a rise half cycle size between a detected current and a real current that is output by an inductor; program instructions that calculate a current variation amount and determining an offset compensation value for compensating a current variation amount according to the comparison result of the rise half cycle size and the delay time; and program instructions that apply the offset compensation value to compensate the detected current of the inductor.

In such an environmentally-friendly vehicle of the present invention, the delay between a real current output timing and a current measured timing is considered against the inductor output current of the PWM converter to calculate the average current of the current in real time such that the offset value is accurately compensated, and therefore the output and the power of the PWM converter are stably and reliably limited.

DEFINITIONS

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
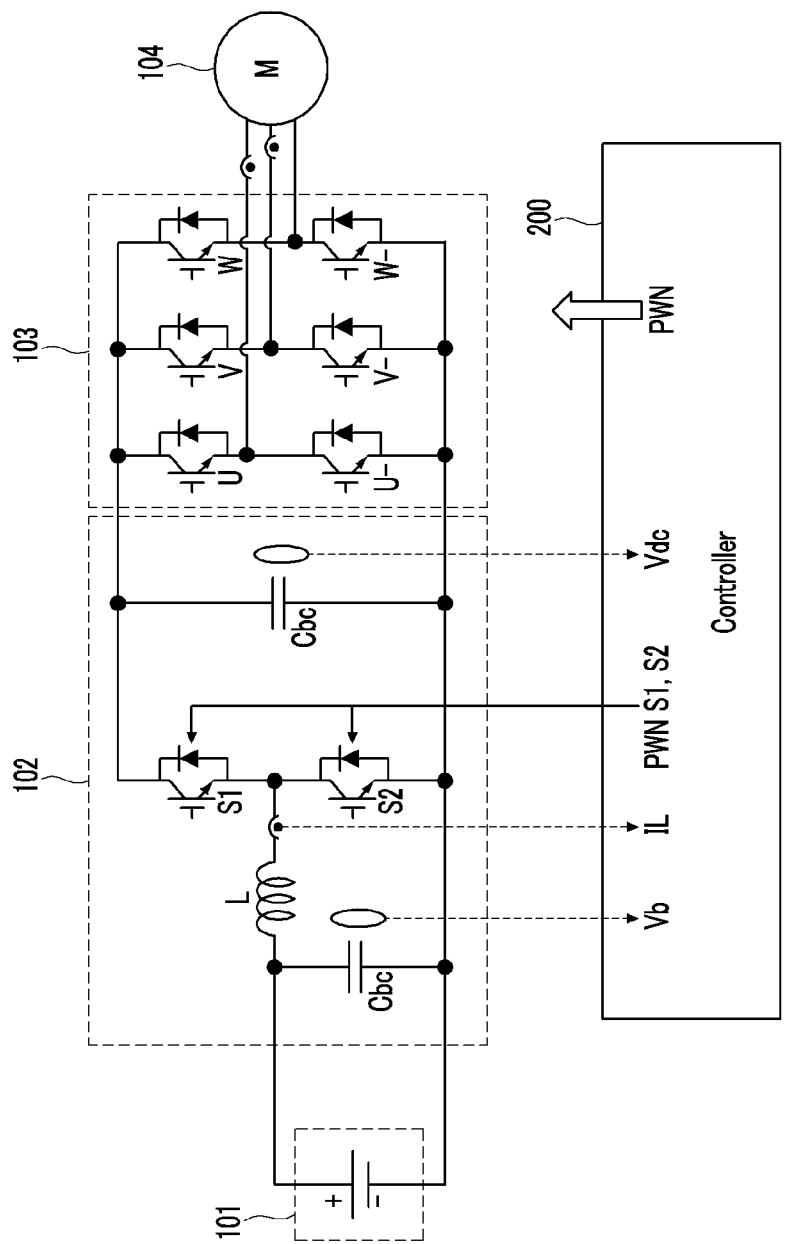
FIG. 1 schematically shows a DC-DC converter and an inverter for an environmentally-friendly vehicle according to an exemplary embodiment of the present invention.

The following list of reference characters is provided for the reader's convenience:

101: battery
102: DC-DC converter
103: inverter
104: motor
200: controller

DETAILED DESCRIPTION OF THE EMBODIMENTS

Hereinafter, the present invention will be described more fully with reference to the accompanying drawings, in which exemplary embodiments of the invention are shown.

As those skilled in the art would realize, the described embodiments can be modified in various different ways, all without departing from the spirit or scope of the present invention.

In order to clarify the present invention, parts that are not connected with the description will be omitted, and the same elements or equivalents are referred to with the same reference numerals throughout the specification.

Also, the size and thickness of each element are arbitrarily shown in the drawings, but the present invention is not necessarily limited thereto, and in the drawings, the thickness of layers, films, panels, regions, etc., are exaggerated for clarity.

FIG. 1 schematically shows a current compensation device of a DC-DC converter for an environmentally-friendly vehicle according to an exemplary embodiment of the present invention.

Referring to FIG. 1, an exemplary embodiment of the present invention includes a battery 101, a DC-DC converter 102, an inverter 103, a motor 104, and a controller 200.

The battery 101 includes a plurality of unit cells to store DC electricity as a high voltage.

The battery 101 can include one of a nickel-hydrogen battery, a lithium-ion rechargeable battery, and a large capacity capacitor to supply the stored DC high voltage to the DC-DC converter 102.

The DC/DC converter 102 is disposed between the battery 101 and the inverter 103, and boosts the DC voltage that is supplied from the battery 101 to a predetermined level according to the PWM duty signal of the controller 200 to output it to the inverter 103.

The DC-DC converter 102 includes a smoothing capacitor ($C_{bc}$), an inductor (L), a first switching element S1, a second switching element S2, and a DC link capacitor ($C_{dc}$).

The smoothing capacitor ($C_{bc}$) smoothes a voltage variation between both ends of the battery 101 to stabilize the voltage that is outputted from the battery 101.

The inductor (L) prevents the current from rapidly varying according to the variation amount of the voltage that is supplied through the smoothing capacitor ($C_{bc}$).

The first switching element S1 and the second switching element S2 boost the voltage of the battery 101 that is supplied through the inductor (L) to a predetermined high level according to the PWM duty signal that is transmitted from the controller 200.

The DC link capacitor ($C_{dc}$) temporarily stores the voltage boosted by the first switching element S1 and the second switching element S2 to supply it to the inverter 103.

The inverter 103 transforms the DC voltage that is boosted by the DC-DC converter 102 according to the PWM duty signal of the controller 200 to a three-phase AC voltage, and the AC voltage is supplied to the motor 104 to drive the motor 104.

A power switching element outputting U, V, and W phases is disposed at an upper side and a lower side that are connected in series in the inverter 103.

The power switching element includes one of a NPN transistor, an IGBT (insulated gate bipolar transistor), and a MOSFET.

The motor 104 is a three-phase AC type, generates a driving torque through a three-phase AC voltage that is supplied from the inverter 103, and is operated as a generator during the regenerative braking of a vehicle.

The controller 200 applies predetermined current instruction map data to generate a PWM signal for switching the DC-DC converter 105 according to torque instructions that are transmitted from a senior controller, the first switching element S1 and the second switching element S2 are switched thereby to boost the voltage of the battery 101 to a predetermined level, and the boosted voltage is supplied to the inverter 103.

While the controller 200 generates PWM duty signals (PWM S1, PWM S2) according to the torque instructions of the controller to switch the first switching element S1 and the second switching element S2 such that the voltage of the battery 101 is boosted, the output voltage ($V_b$) of the battery 101 is detected through the smoothing capacitor ($C_{bc}$), and the output voltage ($V_{dc}$) of the DC-DC converter that is charged in the output current ($I_b$) and the DC link capacitor ($C_{dr}$) of the inductor (L) to output the power following the demanded instruction.

While the voltage of the battery 101 is being boosted through the switching of the first switching element S1 and the second switching element S2 of the DC-DC converter 102, the controller 200 detects an ascent slope and a descent slope of the pulsatory current that is outputted as a chopping wave form from the inductor (L) to calculate a current variation amount, calculates average current of the inductor according to the PWM duty signal by considering a delay of a real current and a detected current to generate an offset value in real time, and compensates the offset value such that the current control and the power limitation are stably operated.

The operation of the present invention including the functions as described above is as follows.

The present invention relates to a method for compensating a time difference of a real current and a detected current that are output as a pulsatory type from the inductor (L) of the DC-DC converter, and this method will be described for when the voltage of the battery 101 is being boosted by the switching of the DC-DC converter 102 during the driving of the environmentally-friendly vehicle. The other control operations are similar to or the same as those of the conventional environmentally-friendly vehicle, and therefore the detailed description thereof will be omitted.

Figure 2:
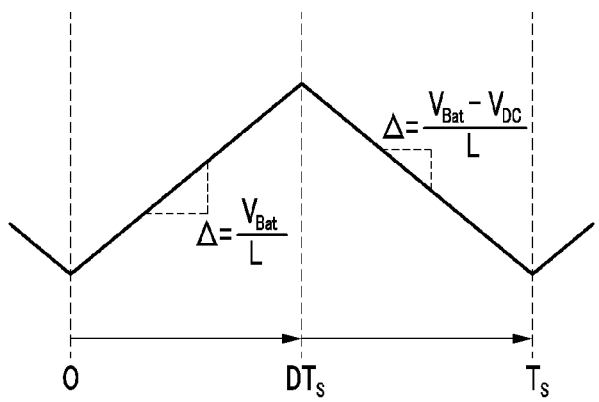
FIG. 2 shows a current wave form that is outputted from an inductor of a DC-DC converter for an environmentally-friendly vehicle according to an exemplary embodiment of the present invention.

FIG. 2 shows a current wave form that is outputted from an inductor of a DC-DC converter for an environmentally-friendly vehicle according to an exemplary embodiment of the present invention.

Referring to FIG. 2, when the voltage of the battery 101 is boosted by switching the first switching element S1 and the second switching element S2 that are disposed in the DC-DC converter 102, the inductor (L) outputs current as a pulsatory type.

In this process, if a voltage equation is used, an ascent slope of the current that is output by the inductor (L) can be calculated as described in Equation 1, and a descent slope thereof can be calculated as described in Equation 2.

$$\Delta = \frac{V_{Bat}}{L} \qquad \text{(Equation 1)}$$

$$\Delta = \frac{V_{Bat} - V_{DC}}{L} \quad \text{(Equation 2)}$$

Accordingly, the length and the slope of the inductor (L) current are applied to be able to calculate a current variation amount in the ascent slope in Equation 3 and calculate a current variation amount in the descent slope in Equation 4.

$$\Delta i_{L\_inc} = \frac{V_{Bat}}{L} \times DT_3 \quad \text{(Equation 3)}$$

$$\Delta i_{L\_dec} = \frac{V_{Bat} - V_{DC}}{L} \times (1-D)T_3 \quad \text{(Equation 4)}$$

As depicted in Equations 3 and 4, the ascent slope and the descent slope of the output current of the inductor (L) do not coincide.

Figure 3:
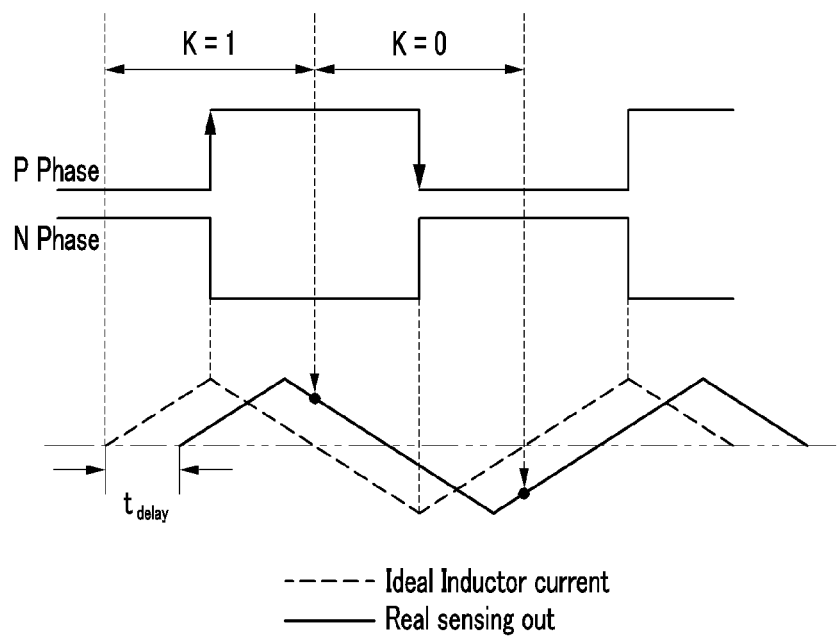
FIG. 3 shows a current output relationship of switching and an inductor of a DC-DC converter for an environmentally-friendly vehicle according to an exemplary embodiment of the present invention.

Accordingly, referring to FIG. 3, an on/off mode of the PWM signal can be defined as follows.

For example, a PWM off sequence is defined from a point of K=0 and a PWM on sequence is defined from a point of K=1 based on a P phase that is a switching on/off signal of the first switching element S1 of the DC-DC converter 102.

Figure 4:
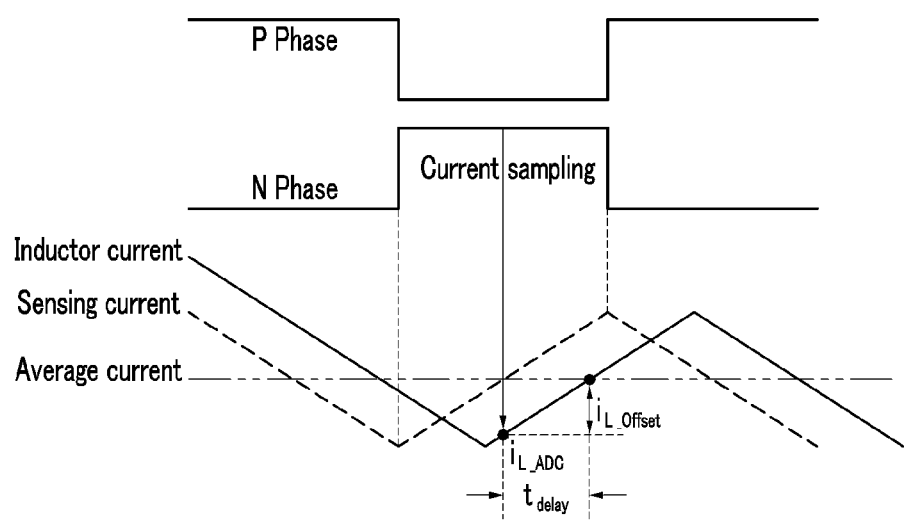
FIG. 4 is a first illustration showing a current output relationship of switching and an inductor of a DC-DC converter for an environmentally-friendly vehicle according to an exemplary embodiment of the present invention.

FIG. 4 is a first illustration showing a current output relationship of switching and an inductor of a DC-DC converter for an environmentally-friendly vehicle according to an exemplary embodiment of the present invention.

FIG. 4 shows an example having a period in which the ascent slope and the descent slope of a detected current and a real current that is outputted from the inductor (L) according to the switching of the DC-DC converter are equal.

As described in Equation 3 and Equation 4, because the variation amount of the inductor (L) current can be calculated by applying the current slope and the delay time (length), the variation amount of the average current within one cycle can be calculated by using a current variation amount during a sensing delay time.

Accordingly, a current variation amount during the ascent of the inductor (L) output current according to the PWM on mode can be calculated by applying Equation 5 below, and a current variation amount during the descent of the inductor (L) output current according to the PWM off mode can be calculated by applying Equation 6 below.

$$i_{L\_offset\_inc} = \frac{V_{Bat}}{L} \times t_{delay} \quad \text{(Equation 5)}$$

$$i_{L\_offset\_dec} = \frac{V_{Bat} - V_{DC}}{L} \times t_{delay} \quad \text{(Equation 6)}$$

Figure 5:
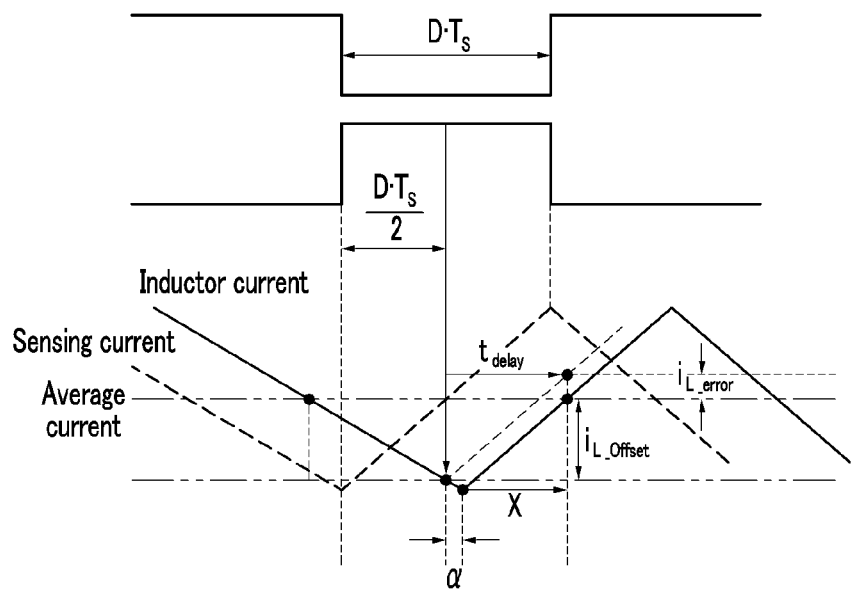
FIG. 5 is a second illustration showing a current output relationship of switching and an inductor of a DC-DC converter for an environmentally-friendly vehicle according to an exemplary embodiment of the present invention.

FIG. 5 is a second illustration showing a current output relationship of switching and an inductor of a DC-DC converter for an environmentally-friendly vehicle according to an exemplary embodiment of the present invention.

FIG. 5 shows an example in which the slope of the detected current is different from that of the real current that is outputted from the inductor (L) of the DC-DC converter according to PWM on/off, and as shown in the drawings, in a condition in which a delay time of the detected current and the real current that is outputted from the inductor (L) is larger than $0.5 \times D' \times T_s$, when compensation is performed between the real current and the detected current in a general condition, the $I_{L\_error}$ is formed as depicted in the drawings.

Accordingly, Equation 9 is applied to calculate a current variation amount during the ascent of the inductor (L) output current according to the PWM on, and Equation 10 is applied to calculate a current variation amount during the descent of the inductor (L) output current according to the PWM off.

Firstly, in FIG. 5, a delay time "a" of the ascent slope and a delay time "a" of the descent slope are calculated by applying Equation 7 below.

$$a' = t_{delay} - \frac{D'T_s}{2} \quad \text{(Equation 7)}$$

$$a = t_{delay} - \frac{DT_s}{2}$$

Further, a deviation of the length is calculated by applying Equation 8 below in FIG. 5.

$$x' = t_{delay} - a' = \frac{D'T_s}{2} \quad \text{(Equation 8)}$$

$$x = t_{delay} - a = \frac{DT_s}{2}$$

Accordingly, a current variation amount of the ascent slope and a current variation amount of the descent slope are calculated by applying Equations 9 and 10 below.

$$\therefore i_{L\_offset\_inc} = \frac{V_{BAT} - V_{DC}}{L} \times a' + \frac{V_{BAT}}{L} \times x' \quad \text{(Equation 9)}$$

$$= \frac{(V_{BAT} \times t_{delay} - V_{DC} a')}{L}$$

$$\therefore i_{L\_offset\_dec} = \frac{(V_{BAT} t_{delay} - V_{DC} \times x)}{L} \quad \text{(Equation 10)}$$

Figure 6:
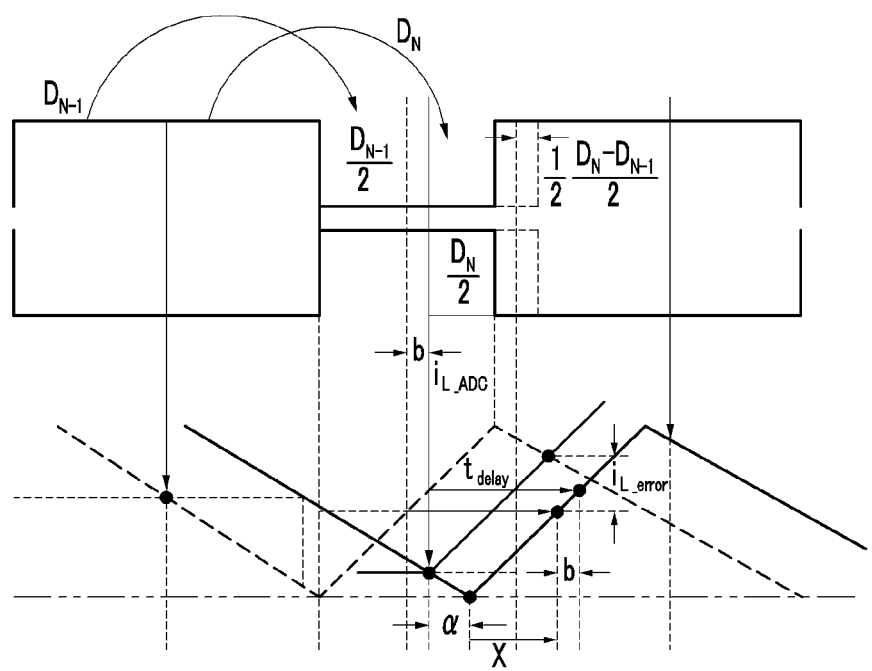
FIG. 6 is a third illustration showing a current output relationship of switching and an inductor of a DC-DC converter for an environmentally-friendly vehicle according to an exemplary embodiment of the present invention.

FIG. 6 is a third illustration showing a current output relationship of switching and an inductor of a DC-DC converter for an environmentally-friendly vehicle according to an exemplary embodiment of the present invention.

Referring to FIG. 6, the real current that is outputted from the inductor (L) and the detected current are detected through double sampling.

In the double sampling as depicted in FIG. 6, half of a difference between a previous $D_{N-1}$ and $D_N$ can be calculated.

Accordingly, the ascent slope and the descent slope of the current are divided by the PWM on/off, each duty variation amount is added thereby, and the current variation amount is calculated in the ascent slope by applying Equation 11 below and the current variation amount is calculated in the descent slope by applying Equation 12 below.

$$i_{L\_offset\_inc} = \frac{V_{Bat}}{L} \times (t_{delay} - b') \quad \text{(Equation 11)}$$

$$i_{L\_offset\_dec} = \frac{V_{Bat} - V_{DC}}{L} \times (t_{delay} - b) \quad \text{(Equation 12)}$$

Also, in a condition in which the slopes of the detected current and the real current that is outputted from the inductor (L) are different according to the switching of the DC-DC converter, if the delay time of the detected current and the real current that is outputted from the inductor (L) is larger than $0.5*(1-D)*T_s$, when compensation is performed between the real current and the detected current in a general condition, the $I_{L\_error}$ is calculated as depicted in FIG. 6.

Firstly, in FIG. 6, the delay time "a'", "b'" of the ascent slope are calculated by applying Equation 12 below, and the delay time "a", "b" of the descent slope are calculated by applying Equation 14 below.

$$a' = t_{delay} - \frac{D'_{N-1}T_s}{2}$$ (Equation 13)

$$a = t_{delay} - \frac{D_{N-1}T_s}{2}$$

$$b' = \frac{D'_N - D'_{N-1}}{4}T_s$$ (Equation 14)

$$b = \frac{D_N - D_{N-1}}{4}T_s$$

And, a deviation of the length can be calculated by the following Equation 15.

$$\therefore x' = t_{delay} - a' + b'$$

$$\therefore x = t_{delay} - a + b$$ (Equation 15)

Accordingly, the current variation amount of the ascent slope and the current variation amount of the descent slope can be calculated by applying the following Equations 16 and 17.

$$\therefore i_{L\_offset\_inc} = \frac{V_{BAT} - V_{DC}}{L} \times a' + \frac{V_{BAT}}{L} \times x'$$ (Equation 16)

$$\therefore i_{L\_offset\_dec} = \frac{V_{BAT}}{L} \times a + \frac{V_{BAT} - V_{DC}}{L} \times x$$ (Equation 17)

Figure 7:
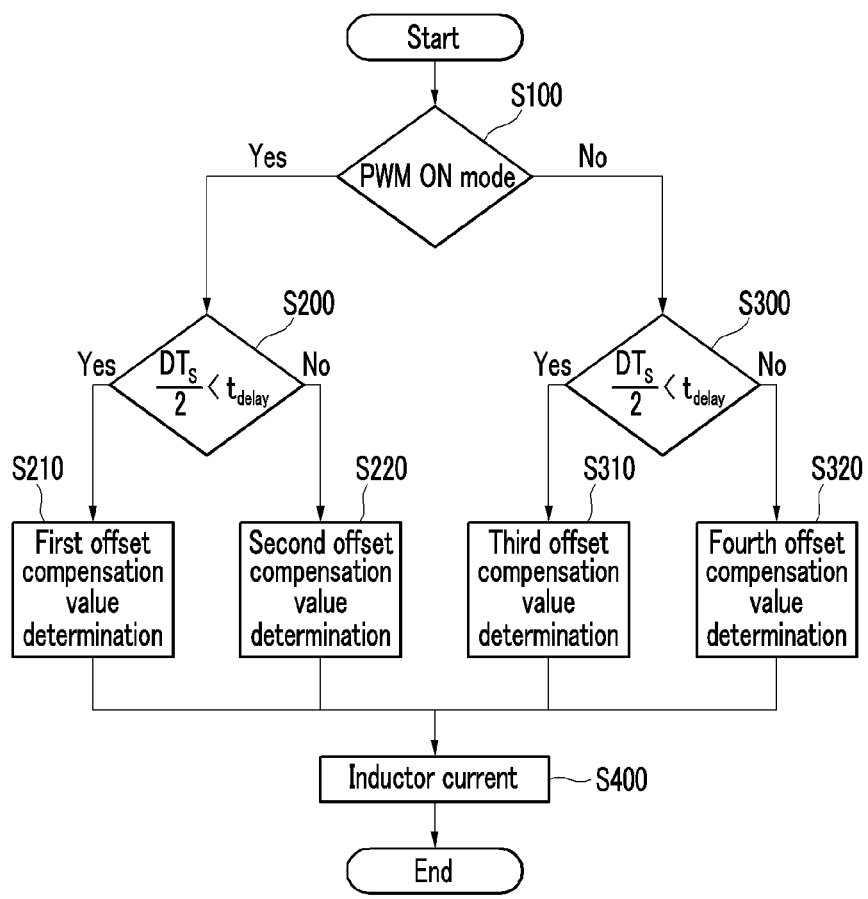
FIG. 7 is a flowchart showing a current measurement procedure of a DC-DC converter for an environmentally-friendly vehicle according to an exemplary embodiment of the present invention.
Figure 8:
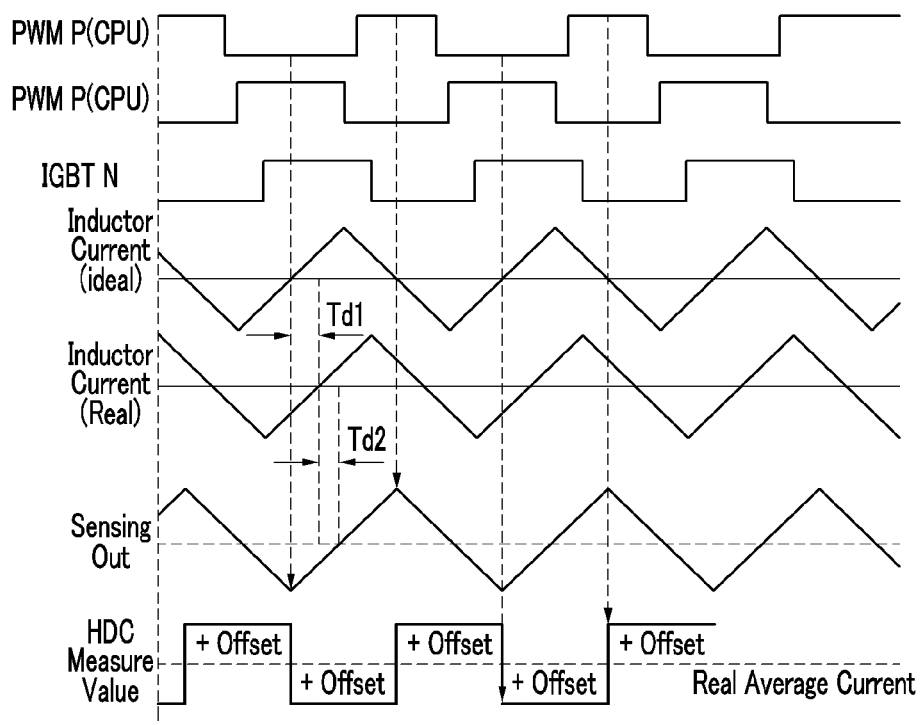
FIG. 8 shows an offset of an inductor current in a DC-DC converter for a conventional environmentally-friendly vehicle.

FIG. 7 is a flowchart showing a current measurement procedure of a DC-DC converter for an environmentally-friendly vehicle according to an exemplary embodiment of the present invention.

Referring to FIG. 7, the controller 200 analyzes the PWM control of the DC-DC converter 102 to determine whether the PWM is in an on mode based on a first switching element S1 (S100).

If the PWM is in on mode in step S100, it is determined whether the size of the ascent half cycle (D'T$_s$) is less than the delay time (t$_{delay}$) (S200).

If the size of the ascent half cycle (D'T$_s$) has a value that is less than the size of the delay time (t$_{delay}$) in step S200, the controller 200 determines that it is an abnormal condition in which the slopes of the detected current and the real current that is outputted from the inductor (L) are different to calculate the current variation amount of the ascent slope by applying Equation 8 and to determine the first offset compensation value for compensating the current variation amount (S210).

However, if the size of the ascent half cycle (D'T$_s$) is larger than the delay time (t$_{delay}$) in step S200, the controller 200 determines the ascent slope and the descent slope of the detected current and the real current that is outputted from the inductor (L) to calculate the current variation amount of the ascent slope by applying Equation 5 and to determine a second offset compensation value for compensating the current variation amount (S220).

Also, if it is in the PWM off mode in step S100, it is determined whether the size of the descent half cycle (DT$_s$) is smaller than the delay time (t$_{delay}$) S300.

If the size of the descent half cycle (DT$_s$) is smaller than the delay time (t$_{delay}$) in step S300, the controller 200 determines that it is an abnormal condition in which the slopes of the detected current and the real current of the inductor (L) are different to calculate the current variation amount of the descent slope by applying Equation 10 and to determine a third offset compensation value for compensating the current variation amount (S310).

However, if the size of the descent half cycle (DT$_s$) is larger than the delay time (t$_{delay}$) in step S300, the controller 200 determines that the ascent slope and the descent slope of the detected current and the real current that is outputted from the inductor (L) are equal to calculate the current variation amount of the descent slope by applying Equation 6 and to determine a fourth offset compensation value for compensating the current variation amount (S320).

After this, an offset compensation value is applied to compensate the current variation amount that is determined in each condition such that the output current of the inductor (L) can be accurately measured as in the following Equation 18.

$$i_{L\_offset} = \begin{cases} i_{L\_offset\_inc} \\ i_{L\_offset\_dec} \end{cases}$$ (Equation 18)

$$\therefore i_L = i_{L\_ADC} + i_{L\_offset}$$

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Furthermore, the control logic of the present invention can be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

What is claimed is:

1. A method for compensating a current of a PWM converter, comprising:
    analyzing a PWM signal for a switching PWM converter;
    if the PWM signal is on, comparing a delay time with a rise half cycle size between a detected current and a real current that is output by an inductor;
    calculating a current variation amount and determining an offset compensation value for compensating a current variation amount according to the comparison result of the rise half cycle size and the delay time; and
    applying the offset compensation value to compensate the detected current of the inductor.

2. The method for compensating a current of a PWM converter of claim 1, wherein if the PWM signal is off, the method further comprises:
    comparing a descent half cycle size and a delay time between a real current that is outputted from an inductor and a detected current;
    calculating a current variation amount according to the comparison result of the descent half cycle size and the delay time to determine an offset compensation value for compensating the current variation amount; and applying the offset compensation value to compensate the detected current of the inductor.

3. The method for compensating a current of a PWM converter of claim 1, wherein if the size of an ascent half cycle is less than a delay time when the size of an ascent half cycle is compared with a delay time in a condition that the PWM signal is on, it is determined that a slope of a real output that is outputted from an inductor is different from that of a detected current and a current variation amount of the ascent slope is calculated to determine an offset compensation value for compensating a current variation amount.

4. The method for compensating a current of a PWM converter of claim 1, wherein if the size of an ascent half cycle is larger than a delay time when the size of an ascent half cycle is compared with a delay time, it is determined that a slope of a real current that is outputted from an inductor is equal to that of a detected current, and a current variation amount of an ascent slope is calculated to determine an offset compensation value for compensating a current variation amount.

5. The method for compensating a current of a PWM converter of claim 2, wherein if the size of a descent half cycle is smaller than a delay time when the size of a descent half cycle is compared with a delay time in an off condition of the PWM signal, it is determined that a slope of a real current that is outputted from an inductor is different from that of a detected current, and a current variation amount of a descent slope is calculated to determine an offset compensation value for compensating a current variation amount.

6. The method for compensating a current of a PWM converter of claim 2, wherein if the size of a descent half cycle is larger than a delay time when the size of a descent half cycle is compared with a delay time in an off condition of the PWM signal, it is determined that a slope of a real current that is outputted from an inductor is equal to that of a detected current, and a current variation amount of a descent slope is calculated to determine an offset compensation value for compensating a current variation amount.

7. A non-transitory computer readable medium containing program instructions executed by a processor or controller for implementing a method for compensating a current of a PWM converter, the computer readable medium comprising:

program instructions that analyze a PWM signal for a switching PWM converter;

program instructions that, if the PWM signal is on, compare a delay time with a rise half cycle size between a detected current and a real current that is output by an inductor;

program instructions that calculate a current variation amount and determining an offset compensation value for compensating a current variation amount according to the comparison result of the rise half cycle size and the delay time; and program instructions that apply the offset compensation value to compensate the detected current of the inductor.

* * * * *